April 3, 1962    P. B. HELSDON    3,028,508
SAW TOOTH WAVE GENERATORS
Filed March 10, 1958
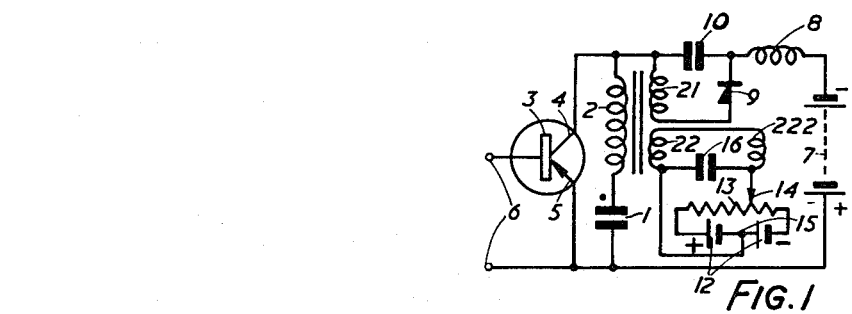
FIG. 1
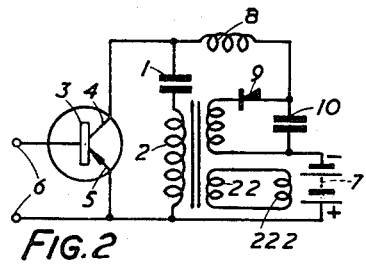
FIG. 2
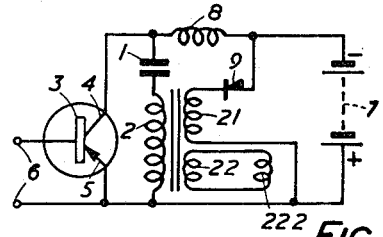
FIG. 3
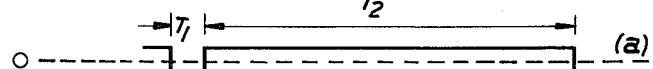
(a)
(b)
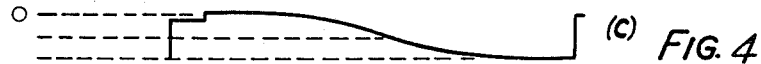
(c)  FIG. 4
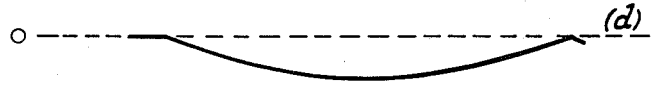
(d)
(e)
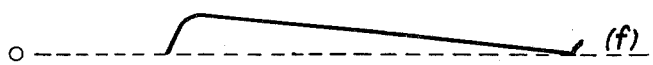
(f)
INVENTOR:
Peter Bennett Helsdon
BY: Baldwin & Wight
ATTORNEYS

United States Patent Office 3,028,508
Patented Apr. 3, 1962

3,028,508
SAW TOOTH WAVE GENERATORS
Peter Bennett Helsdon, Essex, England, assignor to Marconi's Wireless Telegraph Company Limited, London, England, a company of Great Britain
Filed Mar. 10, 1958, Ser. No. 720,411
Claims priority, application Great Britain Apr. 23, 1957
7 Claims. (Cl. 307—88.5)

This invention relates to saw tooth wave generators and more specifically to saw tooth current wave generators suitable for use for producing electro-magnetic scanning in television and similar cathode ray tubes. The invention seeks to provide improved saw tooth current wave generators which may be driven by wave forms of the timing and shape normal in television systems; which may be operated directly from commonly available potential sources; which shall be efficient and economical of power; and which shall be such that transistors may be used therein without difficulty and without requiring the provision of any special shapes of timing wave or inconvenient voltage supplies.

According to this invention, a saw tooth current wave generator comprises an inductance in which saw tooth current waves are to be generated, a condenser connected in series with the inductance, means including a source of direct current potential in series with a second inductance for charging the condenser through the inductance, this means being connected in parallel with the series connected capacitor and inductance, a normally open switch connected in parallel with the series connected condenser and inductance, means for periodically closing the switch for short periods of time sufficient to allow the condenser to be substantially completely discharged and means responsive to the voltage across the first inductance for holding the junction point of the condenser and first inductance at a predetermined voltage limit when the switch is open, the means responsive to the voltage across the first inductance including a unilateral device and an additional inductance, a transformer coupled to the first inductance and connected in series across a reservoir of direct current potential included in the charging circuit of the condenser, the transformer coupling being so arranged that substantially all the energy delivered to the additional inductance supplements that supplied by the source to charge the condenser.

In the principal applications of the invention—notably to saw tooth current wave generators for television scanning—the switch will in practice be a voltage actuatable electronic switch. It may be a valve but is preferably a transistor, for transistors may be used most satisfactorily as the switches in the circuits of this invention.

The invention is illustrated in and explained in connection with the accompanying drawings in which FIGS. 1 to 4 inclusive are diagrams of three embodiments of the invention and FIG. 4 is a set of explanatory graphs related to the operation of FIG. 1. Throughout the figures like references denote like parts.

Referring to FIG. 1, this shows a saw tooth current wave generator suitable for producing electro-magnetic deflection in a cathode ray tube (not shown). The generator is operated by the usual periodic pulse wave form commonly available in television systems and produces a saw tooth current wave of good shape in response to each applied pulse. Describing now the circuit of FIG. 1, this comprises a condenser 1 in series with an inductance 2 in which the required saw tooth current wave form is to be generated. In FIG. 1 the inductance 2 is transformer-coupled to the deflection windings 222 of the cathode ray tube via the transformer secondary winding. Across the series circuit comprising the elements 1 and 2 is a voltage operated switch actually constituted by a transistor, the base electrode of which is represented at 3 and the collector and emitter electrodes of which are shown at 4 and 5 respectively. In the absence of any applied potential between input terminals 6 the switch constituted by the transistor is open. A periodic pulse wave form of the required frequency and as conventionally represented at line (a) of FIG. 4 is applied at the input terminals 6, i.e. between the base and the emitter, and each pulse is of such magnitude as to close the transistor-switch. As will be clear later, the width $T_1$ of each applied pulse corresponds to "flyback" time in the generated saw tooth and the period $T_2$ between the trailing edge of one pulse and the leading edge of the next corresponds to the long sloping face of the generated saw tooth, the sum $T_1+T_2$ being the time period of the saw tooth.

Also connected across the series circuit comprising the elements 1 and 2 is a potential source 7 represented as a battery in series with an inductance 8 which latter is thus included in the charging circuit for the condenser 1. A further inductance 21 transformer-coupled to the inductance 2 is connected in series with crystal or other diode rectifier 9 across a further condenser 10 which is in turn in series between the inductances 8 and 2.

With this arrangement the transistor acts as a switch which is closed for the flyback period $T_1$ (it may be closed a little longer) and open during the rest of each cycle. The values of the elements 1 and 2 are such that the former can discharge substantially completely through the latter in the period $T_1$ so that substantially all the energy acquired by the condenser 1 during the previous cycle is transferred to the inductance 2. Because of the circuit 9—10 this energy cannot oscillate between the elements 1 and 2 when the transistor switch is closed or between the element 2 and the associated stray capacity when the said transistor switch is open. At the end, however, of a flyback period $T_1$ the decreasing current in inductance 2 generates a negative voltage which, when it becomes equal to the direct current voltage stored in the condenser 10, causes the rectifier 9 to conduct. The value of the element 10 is so chosen that the voltage stored in the element 10 by the pulsating current through the rectifier 9 is substantially constant and acts accordingly as an automatically self-adjusting reference voltage which causes the current in inductance 2 to decay in an exponential manner. Assuming that the deflection coils 2 have negligible resistive losses, the exponential decay curve will approximate to a straight line and the saw tooth current wave will be a sufficiently close approximation to a linear saw tooth.

At the end of period $T_1$ the condenser 1 is substantially completely discharged so that the inductance 8 has the sum of the voltage of the battery 7 and the condenser 10 impressed across it throughout the period $T_1$ and at the beginning of the period $T_2$. Accordingly an increasing current is built up in inductance 8, the value of which is chosen to resonant with the condenser 1 at half the frequency given by the reciprocal of the sum $T_1+T_2$. This causes the voltage across condenser 1 to build up sinusoidally and reach a peak value equal to twice the battery voltage V at the end of period $T_2$. Accordingly the flyback voltage applied to the coils 2 at the beginning of period $T_1$ will be (neglecting losses) 2 v. The current in the inductance 8 will vary substantially sinusoidally reaching a peak about half-way through period $T_2$ and decaying to nearly zero at the end of that period. If inductance 8 is made much larger than is necessary for the aforesaid action (as it can be) the build up of voltage across condenser 1 during the period $T_2$ will be more linear and the current in the inductance 8 will approximate to a parabolic wave form of current. However, the sinusoidal mode of operation is at present preferred.

The end of the period $T_1$ can be delayed slightly, for example as the result of hole storage in the transistor, without materially affecting the operation of the circuit.

The transformation ratio of the inductances 2 and 21 is so chosen that the average current passed by the rectifier 9 equals that required by the inductance 8. In this way substantially all the energy delivered to the inductance 21 from the inductance 2 is used to charge the condenser 10, whose voltage is added to that of the battery 7. Hence the energy delivered by the battery 7 is kept to a minimum.

Because the build up of collector voltage after the beginning of period $T_2$ is slow, switching transient losses, such as are often associated with transistors, are reduced to a minimum.

The operation of the circuit will now be clear from the other curves of FIG. 4. Line (b) of FIG. 4 shows the emitter electrode current of the transistor and illustrates a case where there is hole storage, the small step X being due to this. The curve of collector electrode voltage is shown in line (c) of FIG. 4 while line (d) represents in much exaggerated manner, the current wave form in the inductance 8. The voltage across the inductance 2 is represented at line (e) and line (f) shows the current wave form in the inductance 2. As will be seen this current wave form is a satisfactory saw tooth.

FIG. 1 incidentally shows a circuit for centering the generated saw tooth current wave form with respect to zero current if—as will usually be the case—it is desired that it be so centered. This centering circuit comprises the direct current potential source 12 which is connected across a potentiometer resistance 13, the variable tap 14 on this resistance and a center tap 15 on the potential source 12 being connected to opposite sides of an additional condenser 16 inserted in one of the leads between the coils 22 and 222. A suitable centering circuit may be provided if required in any of the other embodiments of the invention, but in order to simplify the drawings and descriptions, FIG. 1 is the only figure in which such a centering circuit is actually shown herein.

FIG. 5 is a variant of the embodiment of FIG. 4 with the condenser 1 and transformer primary 2 interchanged in position with consequent reversal of the direction of connection of the rectifier 9 and with the positions of the condenser 10 and inductance 8 interchanged in the charging circuit. In view of the description already given of FIG. 4 it is thought that further description of FIG. 5 is unnecessary.

The modification shown in FIG. 6 differs from that shown in FIG. 5 in that the coil 21 and rectifier 9 instead of being across condenser 10 between battery 7 and coil 8, is now straight across the battery 7, the condenser 10 being dispensed with. This circuit economizes in current and it will be seen that the reference voltage beyond which the junction point of the elements 1 and 2 is unable to go when the switch is open is provided entirely via the transformer 21—2 from the battery 7. Accordingly the transformer turn ratio between windings 2 and 21 is so chosen as to make the required reference voltage across the coil 21 equal to the battery voltage.

Obviously the invention is not limited to the particular circuits shown. For example, in FIGS. 1, 2 and 3, the transformers with separate primary and secondary windings may be replaced by equivalent auto-transformers. Again FIGS. 1 to 3 inclusive are all drawn on the assumption that p-n-p transistors are used. Obviously, however, n-p-n transistors could be used in which case, of course, all the diode and battery polarities would be reversed. Similarly if valves were used in place of transistors as switches the voltage polarities would correspond to those used for n-p-n transistor circuits.

I claim:
1. A saw tooth current wave generator comprising a first inductance, in which saw tooth current waves are to be generated, a condenser, a series circuit including said inductance and condenser, means for charging the condenser through the first inductance, said means comprising, in parallel with the series connected condenser and inductance, a source of direct current potential in series with a second inductance, a normally open switch connected in a separate path in parallel with said series connected condenser and inductance, means for periodically closing said switch for short periods of time of such length as to allow said condenser to be substantially completely discharged and means responsive to the voltage across said first inductance for holding the junction point of said condenser with said first inductance at a predetermined voltage limit when the switch is open, whereby the current through said first inductance varies substantially linearly, said last mentioned means comprising a unilaterally conductive device and a further inductance transformer coupled with said first inductance, connected in series across a reservoir of direct current potential included in the charging circuit of said condenser, the transformer coupling being so arranged that substantially all the energy delivered to said further inductance supplements that supplied by said source to charge said condenser.

2. A generator as claimed in claim 1 wherein the switch is a voltage actuatable electronic switch.

3. A generator as claimed in claim 1 wherein the switch is a valve.

4. A generator as claimed in claim 1 wherein the switch is a transistor.

5. A generator as claimed in claim 1 and further comprising means for utilizing the generated saw tooth current waves and means for coupling said first inductance to the utilization means.

6. A generator as claimed in claim 1 wherein said direct current potential reservoir is constituted by said source.

7. A generator as claimed in claim 1 wherein said direct current potential reservoir is constituted by a condenser.

References Cited in the file of this patent

UNITED STATES PATENTS

| | | |
|---|---|---|
| 2,571,824 | Boyd | Oct. 16, 1951 |
| 2,633,554 | Tourshou | Mar. 31, 1953 |
| 2,712,616 | Leeds | July 5, 1955 |
| 2,728,857 | Sziklai | Dec. 27, 1955 |
| 2,760,109 | Schade | Aug. 21, 1956 |
| 2,896,115 | Guggi | July 21, 1959 |
| 2,903,621 | Moore | Sept. 8, 1959 |
| 2,907,900 | Hoyer et al. | Oct. 6, 1959 |